United States Patent [19]

Binegar

[11] 4,262,690
[45] Apr. 21, 1981

[54] HIGH PRESSURE STEM PACKING FOR GATE VALVES

[75] Inventor: Scott W. Binegar, Houston, Tex.

[73] Assignee: ACF Industries, Incorporated, New York, N.Y.

[21] Appl. No.: 71,421

[22] Filed: Aug. 30, 1979

[51] Int. Cl.³ .......................... F16K 3/14; F16J 15/00
[52] U.S. Cl. .............................. 137/246.13; 277/117;
   277/123; 251/214; 251/330; 137/246.22
[58] Field of Search ...................... 137/246.22, 246.13;
   251/214, 326, 327, 330; 277/190, 191, 102, 117,
   123, 136

[56] References Cited

U.S. PATENT DOCUMENTS

| | | | |
|---|---|---|---|
| 1,360,939 | 11/1920 | Hall | 277/190 |
| 3,051,434 | 8/1962 | Gulick | 251/330 |
| 3,663,076 | 5/1972 | Valente | 277/190 X |
| 3,765,642 | 10/1973 | Nelson | 251/327 X |
| 3,923,285 | 12/1975 | Diehl et al. | 251/326 X |
| 3,958,592 | 5/1976 | Wells et al. | 251/327 X |
| 3,964,754 | 6/1976 | Murai et al. | 277/123 X |
| 4,029,294 | 6/1977 | McCaskill et al. | 251/330 X |
| 4,149,558 | 4/1979 | McGee et al. | 251/214 X |

FOREIGN PATENT DOCUMENTS

| | | | |
|---|---|---|---|
| 2444825 | 4/1976 | Fed. Rep. of Germany | 251/214 |
| 534431 | 3/1941 | United Kingdom | 277/102 |
| 2004351 | 3/1979 | United Kingdom | 251/327 |

Primary Examiner—Martin P. Schwadron
Assistant Examiner—A. Michael Chambers
Attorney, Agent, or Firm—Eugene N. Riddle; Stephen T. Belsheim

[57] ABSTRACT

A pressure energized packing arrangement (50, 74) for sealing the stem (64) and bonnet (66) of a high pressure gate valve. A stack of packing rings (90) is compressed against the valve stem and bonnet by retainer rings (92, 94) which are urged together by fluid pressure in the valve body. Extrusion of the packing rings (90) is prevented by metal chamfer rings (102, 108, 114, 120) which are cammed by the retainer rings (92, 94) against the valve stem (64) and bonnet (66). The packing assembly is held together by pins (124) against which metal gaskets (132) are cammed by the retainer rings (92, 94) to prevent extrusion of the packing rings (90) along the pins.

27 Claims, 7 Drawing Figures 4,262,690

HIGH PRESSURE STEM PACKING FOR GATE VALVES

BACKGROUND OF THE INVENTION

This invention relates generally to high pressure packing and deals more particularly with a packing assembly for sealing the stem and bonnet of a gate valve.

In recent years, valves have been called upon to handle increasingly higher pressures, particularly valves which are used in the oil and gas industry where the trend has been toward deeper wells in which pressures up to 30,000 psi and above are sometimes encountered. Aside from the need to handle the high pressure fluids found in such deep wells, the valves must also contend with noxious substances such as hydrogen sulfide gas which can pose serious dangers if permitted to leak. Furthermore, the valves are often exposed to high temperature fluids which can cause thermal distortion of the valve and the various components thereof, including the stem packing.

The various types of packing materials and stem packing arrangements that have been proposed in the past for critical surface valves have not proven to be entirely satisfactory in all respects. Metal packing rings have the advantage of holding up well under high pressures and temperatures. However, they do not seal effectively with the valve stem after it has been galled or otherwise damaged on its outer surface since the metal packing cannot conform adequately to surface irregularities on the stem. While polytetrafluoroethylene and similar plastic materials have proven to be highly desirable as packing materials, they are not wholly without problems when used in high pressure service. Most notably, the application of high pressure to plastic packings tends to severely extrude the packing so that it is quickly dissipated. Such materials are also highly susceptible to wear after repeated cycling of the valve stem. Moreover, plastic packings of this type are susceptible to complete destruction by fire and expand considerably at elevated temperatures short of fire conditions, resulting in a decrease in the sealing capability of the packing when high temperature fluids are handled. In these and other respects, existing packings have performed in an unsatisfactory manner in critical service, and the lack of suitable packing has contributed significantly to delays in the development of high pressure valves.

SUMMARY OF THE INVENTION

The present invention is directed to a high pressure packing assembly which is particularly adapted for sealing the valve stem and bonnet of a critical service gate valve used to handle high pressure fluids. The packing assembly includes a stack of packing rings which may be formed of a plastic material such as polytetrafluoroethylene or the like. The packing rings are sandwiched between a pair of packing retainer rings which are urged together by fluid pressure to squeeze the packing rings firmly against the valve stem and bonnet. Metal chamfer rings on opposite sides of the packing assembly are cammed against the stem and bonnet by the pressure energized retainer rings in order to prevent the plastic packing from being extruded along the stem or bonnet. As a result, the desirable sealing characteristics of plastic packing elements are fully utilized, while the extrusion problem is substantially eliminated.

The packing assembly is held together by pins which are encircled by small metal gaskets each having a chamfer against which the retainer rings act to force the gaskets against the pins by camming action. This prevents extrusion of the packing between the pins and gaskets and thereby increases the useful life of the packing rings. A spring washer energizes the packing at low pressures and compensates for thermal expansion of the packing rings. Sealant injection passages in the bonnet provide emergency sealing. For increased protection against fire, one or more of the packing rings may be formed of a eutectic substance which melts in order to seal against the valve stem in the event of a fire.

DETAILED DESCRIPTION OF THE INVENTION

In the accompanying drawings which form a part of the specification and are to be read in conjunction with:

FIG. 5 is an enlarged fragmentary view of the packing assembly shown in FIG. 3;

FIG. 6 is a perspective view illustrating one of the metal rings which serves as a seal ring for emergency sealant that may be injected into the valve bonnet.

Figures 1, 7:
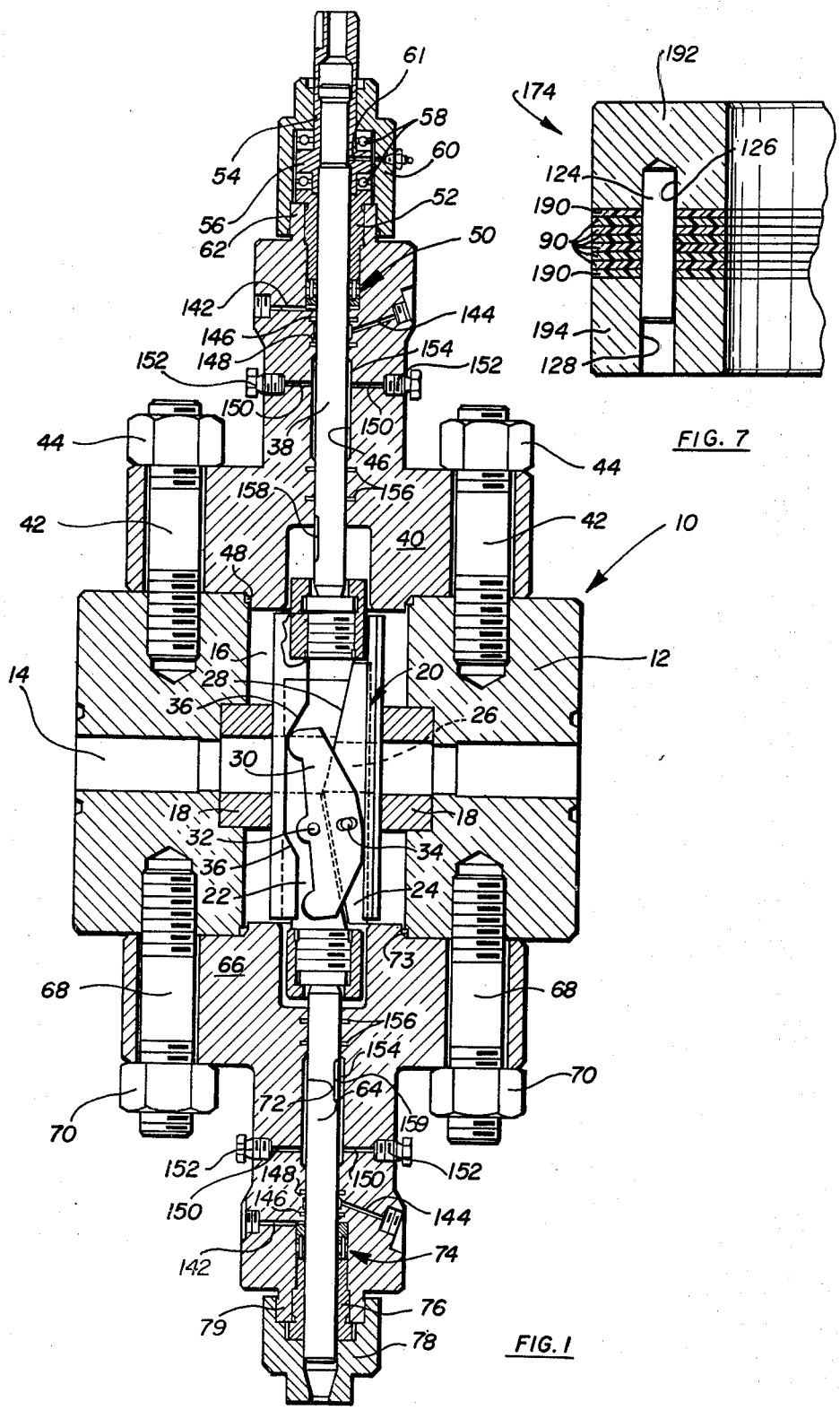
FIG. 1 is a sectional view of a high pressure gate valve which is equipped with a pair of stem packing assemblies constructed in accordance with a preferred embodiment of the present invention.
FIG. 7 is a fragmentary sectional view similar to FIG. 5, but showing a modified packing assembly for use at lower pressures and temperatures.

Referring now to the drawings in more detail and initially to FIG. 1, numeral 10 generally designates an expanding gate valve which is intended to be used primarily in critical service for handling high pressure fluids up to 30,000 psi and above. Valve 10 includes a body 12 having a fluid flow passage 14 therethrough. Flow passage 14 intersects with a valve chamber 16 which is formed in valve body 12. A pair of valve seats 18 are mounted about flow passage 14 adjacent valve chamber 16.

An expanding gate assembly 20 is mounted in valve chamber 16 for movement between an open position and a closed position relative to flow passage 14. Gate assembly 20 includes a gate 22 and a segment 24 which cooperate with one another to expand and contract the gate assembly. In the open position of the gate assembly shown in FIG. 1, gate 22 and segment 24 cooperate to present a port 26 which is aligned with flow passage 14 in order to permit fluid flow through the valve. When gate assembly 20 is moved upwardly to the closed position, port 26 is offset from flow passage 14 and the gate assembly prevents flow through the valve. Gate 22 and segment 24 have adjacent inclined surfaces 28 which act against one another in camming fashion to expand gate assembly 20 firmly against seats 18 in both the fully open and fully closed positions of the valve. A pair of levers 30 collapse gate assembly 20 away from seats 18 when the gate assembly is moving between the open and closed positions. Levers 30 are pivotally mounted to opposite sides of the gate assembly by means of pivot pins 32 extending from gate 22. Pins 34 extending from each side of segment 24 fit loosely through slots in the respective levers 30 to assist in collapsing the gate assembly. The top and bottom of levers 30 ride along cam surfaces 36 to maintain gate assembly 20 in its collapsed condition as it moves between the open and closed positions.

Gate assembly 20 is carried between the open and closed positions by an operating stem 38 which is connected at its lower end with the upper portion of gate 22. A bonnet 40 is secured to valve body 12 by a plurality of threaded studs 42 and nuts 44. Bonnet 40 has a bore 46 through which stem 38 extends. A seal element 48 provides a seal between bonnet 40 and valve body 12. A seal between stem 38 and bonnet 40 is provided by a packing assembly 50 which will be described in more detail.

Immediately above packing assembly 50, a short cylinder 52 extends into the upper portion of bore 46 around stem 38. A sleeve 54 is threaded onto the top end of stem 38 and has an enlarged flange 56 which is located between a pair of bearings 58, one of which is received on an enlarged flange portion on the top end of cylinder 52. A bearing housing 60 is secured to an upstanding neck portion 62 on the top end of bonnet 40. Lubrication of bearings 58 and stem 38 may be achieved by injecting lubricant through a passage 61 extending through bearing housing 60 and flange 56. Sleeve 54 extends out of bearing housing 60 and may be equipped with a handwheel or the like (not shown) which may be turned to axially reciprocate stem 38 in order to move gate assembly 20 between the open and closed positions.

Valve 10 is adapted for high pressure service and is thus equipped with a balancing stem 64 which is connected with the lower end of gate 22. A base or lower bonnet 66 is secured to valve body 12 by a series of threaded studs 68 and nuts 70. Bonnet 66 has a bore 72 which receives stem 64 for axial reciprocation therein. A seal between bonnet 66 and valve body 12 is provided by a seal element 73, while a seal between bonnet 66 and stem 64 is provided by a packing assembly 74 which is substantially identical to the packing assembly 50 mounted in bonnet 40. Packing assembly 74 is held in place by a cylinder 76 which extends into bonnet 66 around stem 64. Cylinder 76 is held in the proper position by a bottom cover 78 which is secured to a neck portion 79 projecting from the bottom end of bonnet 66. Preferably, bonnets 40 and 66 are constructed identically.

Figure 2:
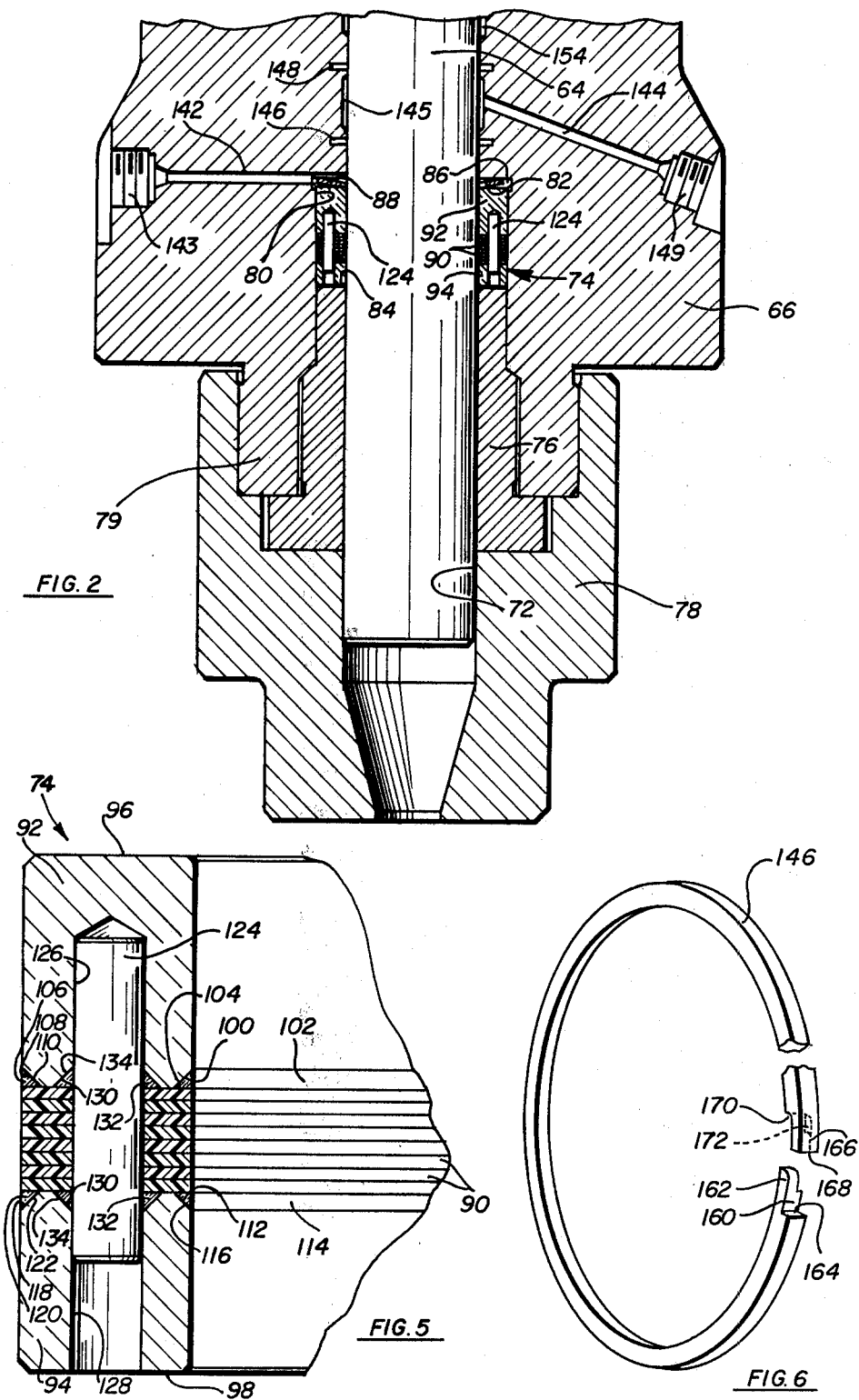
FIG. 2 is a fragmentary sectional view on an enlarged scale of the lower end of the valve shown in FIG. 1.

Since the two packing assemblies 50 and 74 are identical, only the lower packing assembly 74 will be described in detail. Referring particularly to FIG. 2, bore 72 is enlarged near its lower end as indicated at 80 to provide an annular space about stem 64 in which packing assembly 74 is mounted. The annular space which receives packing assembly 74 terminates at its inner end in a flat annular shoulder 82 formed on bonnet 66 to face generally outwardly. At its outer or lower end, the annular space terminates in a flat annular shoulder 84 formed on the top surface of cylinder 76 to face generally inwardly toward valve chamber 16. Packing assembly 74 is mounted between shoulders 82 and 84 in contact with shoulder 84 and spaced slightly from shoulder 82 to provide a small annular spring chamber 86 between shoulder 82 and the packing assembly. Mounted in chamber 86 is a frusto-conical spring washer 88 which acts to continually urge packing assembly 74 outwardly against shoulder 84.

Figure 3:
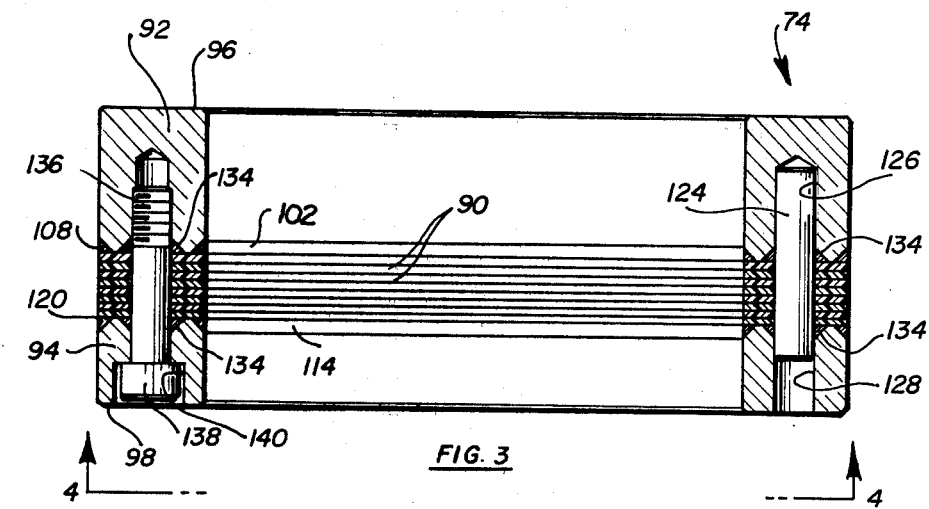
FIG. 3 is an enlarged sectional view of the lower packing assembly shown in FIGS. 1 and 2.
Figure 4:
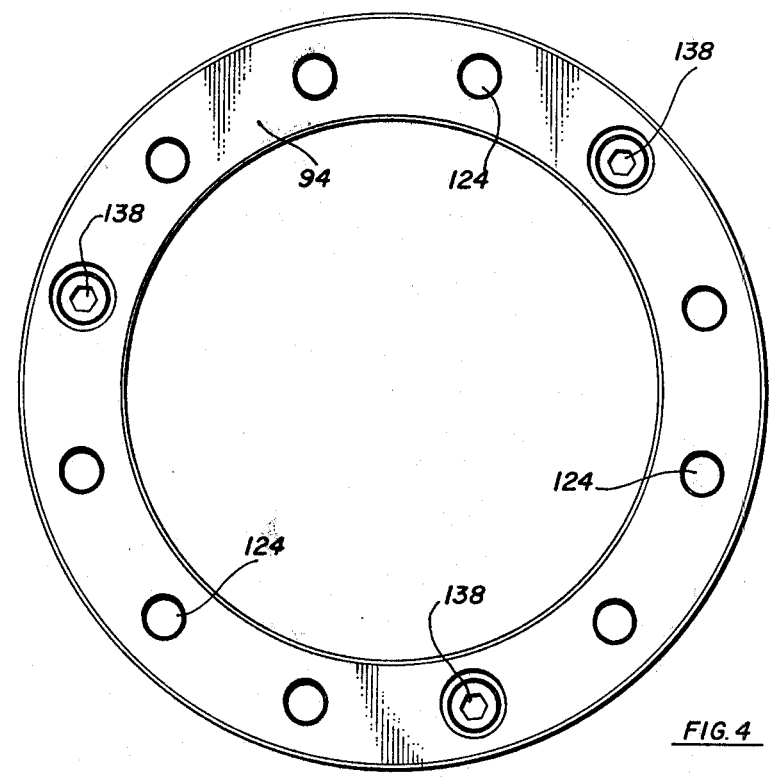
FIG. 4 is a bottom plan view of the packing assembly taken generally along line 4—4 of FIG. 3 in the direction of the arrows.

With additional reference to FIGS. 3-5, packing assembly 74 includes a plurality of packing rings 90 which are arranged against one another in a stack about stem 64. Packing rings 90 may be formed of any suitable material and are preferably a polymeric substance such as polytetrafluoroethylene, polyimide, polyphenylene sulfide, perfluoroalkoxy, or a similar material. Such plastic materials have desirable sealing properties and are able to intimately contact the metal stem 64 and bonnet 66 even when there has been galling or other surface damage. It is to be understood, however, that other suitable materials may be used to form the packing rings. The stack of packing elements 90 is sandwiched between a pair of hard metal packing retainer rings 92 and 94. Retainer ring 92 has a flat inwardly facing surface 96 which is engaged by the spring washer 88, while retainer ring 94 has a flat outer surface 98 which is maintained against shoulder 84 at all times.

At its end which confronts the innermost packing ring 90, retainer ring 92 has a beveled surface 100 adjacent the inside diameter of the retainer ring, as best shown in FIG. 5. Beveled surface 100 presents a cam surface on the inner edge or corner of retainer ring 92 which contacts a hard metal chamfer ring 102. Chamfer ring 102 is positioned between beveled surface 100 and the adjacent packing ring 90. Chamfer ring 102 is triangular in section and has a chamfer 104 which mates with and cams against surface 100. The outer diameter of retainer ring 92 is also beveled as indicated at 106 to provide a beveled edge or corner confronting the adjacent packing ring 90. Another hard metal chamfer ring 108, also triangular in section, has a chamfer 110 which mates with and cams against beveled surface 106. Ring 108 is located between beveled surface 106 and the adjacent packing ring 90 in contact at its outer surface with the adjacent surface of bonnet 66. The inside surface of ring 102 contacts balancing stem 64 to assist in providing a seal against same.

The surface of retainer ring 94 which confronts the outermost packing ring 90 is shaped similarly to the corresponding surface of ring 92. The inside diameter of ring 94 has a beveled surface 112 on the corner or edge thereof which confronts the adjacent packing ring 90. A hard metal chamfer ring 114 which is identical to ring 102 in size and shape is fitted against surface 112 between ring 94 and the adjacent packing ring 90. Ring 114 has a chamfer 116 which mates with surface 112, while the inside surface of ring 114 contacts shaft 64. The outside diameter of ring 94 has a beveled surface 118 on the corner or edge thereof which confronts the adjacent packing ring 90. A hard metal chamfer ring 120 identical to ring 108, is locatd against surface 118 between ring 94 and the adjacent packing ring 90. Ring 120 has a chamfer 122 which mates with and cams against beveled surface 118. The outer surface of ring 120 engages the adjacent surface of bonnet 66.

With continued reference to FIG. 5 in particular, packing assembly 74 is held together by a series of pins 124 which are closely received in aligned openings formed through ring 94, each of the packing rings 90, and partially through retainer ring 92. The openings which extend into retainer ring 92 are designated by numeral 126 and terminate outwardly of surface 96 of the retainer ring. The openings formed through retainer ring 94 are designated by numeral 128 and extend into surface 98 thereof in order to permit insertion of pins 124. Pins 124 are preferably spaced equidistantly around the packing assembly as shown in FIG. 4. The surfaces of retainer rings 92 and 94 located adjacent packing rings 90 are beveled as indicated at 130 on the circular edges around openings 126 and 128. Positioned against each beveled surface 130 between the retainer rings and the adjacent packing rings is an annular hard metal gasket 132 having a chamfer 134 which mates with and cams against the adjacent beveled surface 130. Each gasket 132 is triangular in section and has an inside surface which closely contacts the corresponding pin 124. Preferably, all of the aforementioned beveled surfaces and chamfers are oriented at approximately 45° with respect to the axis of balancing stem 64, although other angles may be employed with satisfactory results.

As best shown in FIGS. 3 and 4, three of the pins 124 are in the form of equally spaced screws which are threaded on one end as indicated at 136 and provided with an enlarged head 138 at the opposite end. Threads 136 engage complementary threads formed in the corresponding opening 126 of ring 92. Heads 138 fit within counterbores 140 formed in surface 98 of retainer ring 94. It should be apparent that the screws limit movement of rings 92 and 94 away from one another without interfering with movement of the packing retainer rings toward one another.

Referring again to FIG. 2, bonnet 66 has a sealant injection passage 142 which leads to spring chamber 86 at its inner end and which is threaded at 143 at its outer end in order to receive a plug (not shown) which normally plugs the passage. Another sealant passage 144 leads to a small annular space 145 provided around stem 64 between a pair of spaced apart metal rings 146 and 148 located inwardly of packing assembly 74. Passage 144 is threaded at its outer end at 149 in order to receive a plug (not shown) which normally plugs the passage. With reference to FIG. 1, bonnets 40 and 66 each have an additional pair of injection passages 150 which are normally sealed by plugs 152. Passages 150 lead to annular spaces 154 which are formed around stems 38 and 64 at locations inwardly of rings 148. Inwardly of each space 154, a pair of metal rings 156 are mounted in bonnets 40 and 66 at spaced apart locations. Rings 156 closely contact stems 38 and 64 in order to assist in sealing against the stems and to scrape foreign materials off of the stems as they reciprocate during opening and closing movement of the gate. Grooves 158 and 159 are formed in stems 38 and 64 at locations to connect with spaces 154 when the gate is in the closed position. When the gate is closed, grooves 158 and 159 extend past rings 156 in order to deliver lubricant or sealant from space 154 past rings 156 and into valve chamber 16 for lubrication of the gate assembly and the components thereof. In the open position of gate assembly 20, groove 158 is located above rings 156 to cut off communication between space 154 and valve chamber 16, while groove 159 is likewise displaced from the lower rings 156.

FIG. 6 illustrates ring 146 in detail, and the same construction is preferably used for each of the additional metal rings 148 and 156. Ring 146 is preferably constructed of a hard metal such as stainless steel and has adjacent free ends which cooperate to provide a joint that permits expansion and contraction of the length or circumference of the ring while preventing leakage through the joint. One free end of ring 146 has a projecting tongue portion 160 which is approximately one-half the radial thickness of the remainder of the ring. A finger portion 162 projects from tongue 160 and has a thickness longitudinally of stem 64 which is approximately half the thickness of the remainder of the ring. A flat surface 164 is presented on ring 146 at the juncture of tongue 160 with the main body of the ring. The abutting end of ring 146 has a projecting tongue portion 166 which is approximately half the radial thickness of the remainder of ring 146. Tongue portion 166 terminates in an end surface 168 adapted to engage surface 164 in order to limit the contraction of ring 146. Inwardly of tongue 166, one side portion of ring 146 is cut partially away as indicated at 170 to provide a flat surface 172 which contacts the adjacent surface of finger 162. Surface 172 is located at approximately a midpoint of the thickness of ring 146. The length or circumference of ring 146 can vary between a minimum length position wherein surfaces 164 and 166 are in contact and a maximum length position wherein the end of finger 162 is adjacent the end of surface 172. Between these two limiting positions, tongue portions 160 and 166 are in contact with one another and finger 162 is in contact with surface 172 to prevent excessive leakage through the joint at which the ends of ring 146 meet.

In use, operating stem 38 is axially reciprocated to move gate assembly 20 between the open and closed positions of the valve. In both the open and closed positions, gate 22 and segment 24 are pressed tightly against seats 18 due to expansion of the gate assembly. Packing assemblies 50 and 74 prevent the high pressure fluid in flow passage 14 and valve chamber 16 from leaking through bonnets 40 and 66. Such fluid pressure is applied to the inner surface 96 of each retainer ring 92 to urge ring 92 outwardly away from shoulder 82 toward the other retainer ring 94. Engagement of surface 98 of ring 94 with shoulder 84 prevents outward movement of ring 94. Consequently, the fluid pressure applied to ring 92 forces the same outwardly toward ring 94 to squeeze or compress packing rings 90 between rings 92 and 94. Such compression or squeezing of the packing rings presses them firmly against stem 64 on their inside diameters and against bonnet 66 at their outside diameters in order to effectively seal against the stem and bonnet. It is noted that the relatively soft plastic packing rings 90 are able to intimately contact stem 64 and bonnet 66 even in the presence of galling or other surface irregularities.

Compression of rings 92 and 94 toward one another also causes camming interaction between surfaces 100 and 104 and between surfaces 112 and 116. Due to the incline of these beveled surfaces and chamfers relative to the axis of stem 66, chamfer rings 102 and 114 are pressed inwardly toward the stem 64 by camming action such that the inside surfaces of the chamfer rings are firmly pressed against the outer surface of stem 64. Consequently, rings 102 and 114 are forced against stem 64 to substantially prevent extrusion of packing rings 90 between the stem and the hard metal chamfer rings, while the chamfer rings also assist in providing a seal against stem 64. The same effect occurs at the outer diameter of packing rings 90 due to the presence of chamfer rings 108 and 120. As retainer rings 90 and 94 are urged toward one another by the fluid pressure, the interaction between surfaces 106 and 110 and between surfaces 118 and 122 presses chamfer rings 108 and 120 outwardly by camming action such that the outside surfaces of the chamfer rings are pressed firmly against the adjacent surface of bonnet 66. The outer chamfer rings 108 and 120 thus prevent extrusion of packing rings 90 between bonnet 66 and the chamfer rings, while they also assist in sealing against the bonnet. It is pointed out that portions of rings 92 and 94 directly contact packing rings 90 to compress them, while other portions of rings 92 and 94 contact the chamfer rings to provide camming action having the effect of preventing extrusion of the packing rings.

When retainer rings 92 and 94 are pressed together by the fluid pressure, surfaces 130 and 134 are pressed against one another to force gaskets 132 inwardly against the pins 124 due to the inclined angle of the cam surfaces. As a consequence, rings 132 firmly engage pins 124 to prevent extrusion of packing rings 90 between the pins and gaskets.

It is thus apparent that the packing assembly fully utilizes the desirable sealing characteristics of plastic packing rings 90 without the packing rings being blown out of position or extruded by the high fluid pressure which is applied thereto. Furthermore, increased fluid pressure causes increased compression of retainer rings 92 and 94 and packing rings 90, thereby increasing the sealing effect of the packing in order to counteract the increased fluid pressure. In addition, the chamfer rings and gaskets are energized more firmly in response to increased fluid pressure such that the susceptibility of the packing rings to extrusion does not increase with increased fluid pressure in the valve body.

Due to the presence of the openings which are formed through packing rings 90 to receive pins 124, the surface of the innermost packing ring which is exposed to retainer ring 92 is smaller than the area of surface 96. Consequently, the force per unit area which is applied to packing rings 90 is greater than the force per unit which is applied to retainer ring 92. Although the same force which is applied to ring 92 is applied to packing rings 90, the surface of the packing rings which is exposed to the force has less area than surface 96 of ring 92. Therefore, the force which is transmitted to packing rings 90 is amplified in order to increase the compression and sealing effect of the packing rings.

At low fluid pressure in the valve body, spring washer 88 energizes packing assembly 74 by urging retainer ring 92 outwardly with sufficient force to compress packing rings 90 against stem 64 and bonnet 66. The packing assembly thus provides an effective low pressure seal. Spring washer 88 also accommodates thermal expansion of packing rings 90 since the spring washer yields to permit movement of retainer ring 92 toward shoulder 82 in the event of thermal expansion of the packing rings caused by exposure to high temperature fluids. Compensation is also made for wear of packing rings 90, since the fluid pressure firmly presses ring 92 toward ring 94 for compression of the packing rings even after some of the material of packing rings 90 has been worn away.

In an emergency situation, sealant material can be injected under high pressure through passage 142. The high pressure sealant is applied to chamber 86 and against rings 92 in order to energize packing rings 90 as well as to seal against stem 64. Metal ring 146 prevents the sealant from leaking inwardly or away from the packing assembly. Since the surface of ring 146 on the outside diameter thereof is larger in area than the inside surface thereof, the fluid pressure applied to the ring tends to contract it firmly against stem 64, with the joint between the free ends of ring 146 permitting such contraction of the ring without leakage through the joint. Finger 162 continually contacts surface 172 to prevent significant leakage of sealant material, thereby assuring that the packing assembly is properly energized by the injected sealant material. Sealant can also be injected through passage 144 in an emergency situation, with rings 146 and 148 preventing leakage of the high pressure sealant. Passages 150 permit additional emergency injection of sealant or lubricant. When gate assembly 20 is in the closed position, the sealant or lubricant injected through passages 150 and into space 154 is able to flow through groove 158 and into valve chamber 16 where it is applied to the gate assembly. Also, fluids such as alcohol and the like can be injected and will flow through valve chamber 16 and out through the lower groove 159 to flush hydrates, dirt, and other foreign matter from the body cavity. In the open position of the valve, the fluid injected through passages 150 is not able to pass rings 156 which contract against stem 38 in the same manner as ring 146.

As previously indicated, packing assembly 50 functions in the same manner as packing assembly 74 to provide an effective seal between operating stem 38 and valve bonnet 40. Although the packing assemblies 50 and 74 are effective over a wide range of pressures and temperatures, they are particularly adapted for high pressure use up to about 30,000 psi since they are pressure energized to provide increased sealing force and increased resistance to extrusion of packing rings 90 when the pressure in the valve body is increased. It is to be understood that balancing stem 64 may be eliminated such that the valve includes only a single packing assembly 50 providing a seal between operating stem 38 and bonnet 40.

It is contemplated that packing rings 90 may in some situations comprise metal rings alternating with plastic packing rings such as polytetrafluoroethylene or a similar material. Such a packing arrangement combines the desirable sealing properties of plastic packing with the desirable characteristics of metal packing. For increased protection against fire, one or more of the packing rings 90 may be constructed of a eutectic substance which melts upon exposure to the heat of a fire. The melted metal of the eutectic is contained between rings 92 and 94 is thus forced in a fluid state against the valve stem and bonnet to provide an effective seal under fire conditions when the plastic packing rings are destroyed.

It is also contemplated that one or more of the packing rings 90 may be in the form of a hard shell or skin which is solid at low pressures and which contains a fluid or flowable plastic type sealant or lubricant. Since the shell or skin is solid at normal pressures, it may be easily handled and assembled. However, when installed in the valve and exposed to high pressures during service, the skin or shell ruptures due to the pressure and releases the fluid sealant or lubricant which is then able to flow into any surface irregularities in the stem or bonnet in order to effectively seal therewith. Various types of material may be used to form the shell or skin, and the fluid sealant may likewise be any suitable material.

FIG. 7 illustrates a modified packing assembly 174 which is intended to be used at lower pressures and/or temperatures than packing assembly 74. Packing assembly 174 is for the most part similar to packing assembly 74 and includes a pair of packing retainer rings 192 and 194 which are identical with rings 92 and 94 except that the surfaces of rings 192 and 194 which confront the packing rings are flat surfaces. Metal rings 102, 108, 114, 120, and 132 are eliminated in the FIG. 7 arrangement. Extrusion of packing rings 90 is prevented by a pair of anti-extrusion rings 190 which are located on opposite ends of the stack of packing rings in contact with rings 192 and 194. Anti-extrusion rings 190 contact the valve stem and bonnet and are preferably formed of a hard material such as polyimide, polyphenylene sulfide, or another hard plastic substance which is able to withstand relatively high pressures without extruding. The packing rings 90 are sandwiched between rings 190 and are formed of a softer material such as polytetrafluoroethylene or perfluoralkoxy, for example, in order to intimately seal against the valve stem and bonnet. Rings 190 are able to prevent excessive extrusion of rings 90 at pressures up to approximately 20,000 psi. However, at higher pressures, rings 190 are themselves extruded, and the beveled metal rings shown in FIGS. 3 and 5 are thus preferred at higher pressures.

What is claimed is:

1. In a valve having a valve body with a fluid flow passage therethrough, a valve member mounted for movement between an open position and a closed position relative to the flow passage, and a movable valve stem connected with the valve member to effect movement thereof between the open and closed positions, said valve body receiving the valve stem and defining an annular space about the stem terminating in a shoulder facing generally inwardly towards the flow passage, the improvement comprising:
 a plurality of packing rings in said annular space arranged in contiguous relation about the valve stem to effect a seal between the stem and the valve body;
 a pair of metal rings disposed closely around the stem on opposite sides of said packing rings so as to sandwich said packing rings between said metal rings; and
 a pair of retainer rings about the stem between which said metal rings and said packing rings are sandwiched, one of said retainer rings having an inwardly facing surface upon which fluid pressure from said flow passage acts so that said retainer rings are urged toward one another to squeeze said packing rings against the stem and the valve body, thereby increasing the effectiveness of the seals with the stem and the valve body created by said packing rings as the fluid pressure increases;
 said retainer rings including camming means including a portion of said camming means interacting with said metal rings in a manner to force said metal rings against the stem and the valve body when said retainer rings are urged toward one another by the fluid pressure from the flow passage, thereby impeding extrusion of said packing rings between the stem and said metal rings and the valve body and said metal rings, the effectiveness of said metal rings in preventing extrusion of said packing rings increasing as the fluid pressure increases.

2. In a valve having a valve body presenting a fluid flow passage therethrough, a valve member mounted in the body for reciprocating movement between an open position and a closed position, a valve stem connected to the valve member to move same between the open and closed positions in response to axial reciprocation of the stem, and a valve bonnet mounted to the body and receiving the valve stem, an improved packing assembly comprising:
 a plurality of packing rings arranged about the valve stem in a stack and contacting the stem and bonnet in sealing relation;
 a pair of anti-extrusion rings arranged about the valve stem at opposite ends of the stack of packing rings to sandwich the packing rings between the anti-extrusion rings, said anti-extrusion rings contacting the stem and bonnet and being formed of a harder substance than said packing rings to impede extrusion of the packing rings along the stem and bonnet; and
 a pair of packing retainer rings between which said anti-extrusion rings and packing rings are sandwiched, one retainer ring having a surface facing inwardly towards the fluid flow passage, said retainer rings being mounted for movement toward one another under the influence of fluid pressure in the flow passage acting on said inwardly facing surface of said one retainer ring to thereby squeeze said packing rings against the valve stem and bonnet for increased sealing force with said anti-extrusion rings acting to impede extrusion of the packing rings between the valve stem and bonnet.

3. A packing assembly as set forth in claim 2, wherein said antiextrusion rings are formed of a hard plastic substance.

4. A packing assembly as set forth in claim 3, wherein said packing rings are formed of polytetrafluoroethylene.

5. A packing structure for sealing a movable shaft to a housing presenting a fluid flow passage which is exposed to a high pressure fluid therethrough, said packing structure comprising:
 a plurality of packing rings mounted about the shaft in sealing contact with the shaft and the housing;
 a pair of retainer rings between which said packing rings are located with one retainer ring having an inwardly facing surface upon which the fluid pressure in the flow passage acts to urge said one retainer ring outwardly toward the other retainer ring, thereby squeezing said packing rings against the shaft and the housing to increase the sealing effect of said packing rings as the fluid pressure acting on said one retainer ring increases;
 each retainer ring having a beveled inside edge adjacent the shaft and a beveled outside edge adjacent the housing; and
 a metal chamfer ring disposed against each beveled edge of each said retainer ring between said retainer ring and the adjacent said packing ring, each said metal chamfer ring having a cam surface thereon contacted by said corresponding beveled edge in a manner to force said metal chamfer rings against the shaft and the housing by camming action upon outward movement of said one retainer ring toward said other retainer ring in response to the fluid pressure from the flow passage, whereby extrusion of said packing rings along the shaft and the housing is substantially prevented by said metal chamfer rings, the effectiveness of said metal chamfer rings in preventing extrusion of said packing rings increases with increased fluid pressure from the flow passage.

6. In a high pressure valve having a valve body presenting a fluid flow passage therethrough, a valve member mounted for movement between an open position and a closed position relative to the flow passage, and a movable valve stem connected with the valve member to effect movement thereof between the open and closed positions, the improvement comprising:

a bonnet on the valve body receiving the valve stem and defining an annular space about the stem terminating in a shoulder facing generally inwardly towards the flow passage;

a plurality of packing rings in said annular space arranged about the valve stem to effect a seal therewith and with the bonnet;

a pair of retainer rings between which said packing rings are located with one retainer ring disposed against said shoulder, other of said packing rings having a surface facing inwardly towards the valve body and upon which the fluid pressure in the flow passage acts to urge the other retainer ring outwardly toward said one retainer ring, thereby squeezing the packing rings against the valve stem and bonnet to increase the sealing effect of the packing rings as the fluid pressure acting on the other retainer ring increases;

each retainer ring having a beveled inside edge adjacent the valve stem and a beveled outside edge adjacent the bonnet; and a metal chamfer ring disposed against each beveled edge of each retainer ring between the retainer ring and the adjacent packing ring, each metal chamfer ring having a cam surface thereon contacted by the corresponding beveled edge in a manner to force the metal chamfer rings against the stem and bonnet by camming action upon outward movement of said other retainer ring toward said one retainer ring in response to the fluid pressure from the flow passage, whereby extrusion of the packing rings along the stem and bonnet is substantially prevented by the metal chamfer rings, the effectiveness of the metal chamfer rings in preventing extrusion of the packing rings increases with increased fluid pressure from the flow passage.

7. A packing structure as set forth in claim 1, wherein at least some of said packing rings are formed of a plastic material.

8. A packing structure as set forth in claim 6, wherein at least some of said packing rings are formed of a fusible metal which melts at a predetermined high temperature to provide a high temperature seal with said shaft.

9. A packing structure as set forth in claim 6, wherein at least one of said packing rings is in the form of a shell which contains therein a flowable sealant material, said shell being substantially imperforate at atmospheric pressure to retain the sealant material therein and breaking upon exposure to a predetermined high pressure to release the sealant material for sealing of same against the shaft.

10. The improvement set forth in claim 6, including:
a second shoulder defined by said bonnet at an inner end of said annular space, said second shoulder facing generally outwardly away from the flow passage; and
a spring located between said second shoulder and said other retainer ring to urge the latter outwardly for squeezing of the packing ring at low fluid pressures in the flow passage, said other retainer ring being movable against the spring force toward the second shoulder to accommodate thermal expansion of the packing rings.

11. The improvement set forth in claim 6, wherein said inwardly facing surface of said other retainer ring has a larger surface area exposed to the fluid pressure in the flow passage than the surface area of the packing rings exposed to said other retainer ring, whereby the force per unit area transmitted from said other retainer ring to the packing rings is amplified.

12. The improvement set forth in claim 6, including:
a plurality of aligned openings in said retainer rings and packing rings, the opening in each retainer ring having a beveled edge confronting the adjacent packing ring;
a plurality of pins in the respective openings of the retainer rings and packing rings; and
an annular metal gasket positioned against each beveled edge about the corresponding pin, each gasket having a cam surface which is engaged by the corresponding beveled edge in camming fashion to force the gaskets against the respective pins in response to outward movement of said other retainer ring, thereby impeding extrusion of the packing rings between the gaskets and pins.

13. A gate valve comprising:
a valve body having a valve chamber and a fluid flow passage;
a gate mounted in the valve chamber for movement between an open position and a closed position relative to the flow passage;
a valve stem carrying the gate between the open and closed positions in response to axial reciprocation of the stem;
a bonnet assembly mounted to the valve body and having a bore in which said valve stem is received for axial reciprocation, said bonnet assembly defining an annular space in said bore around the valve stem and a shoulder facing generally toward the valve chamber at an outer end of said annular space;
a pair of packing retainer rings positioned in said annular space with one retainer ring disposed against said shoulder, the other retainer ring having a surface facing inwardly towards the valve body and upon which the fluid pressure in said valve chamber acts to urge said other retainer ring toward said one retainer ring, each retainer ring having a beveled inside edge adjacent the valve stem and a beveled outside edge adjacent the bonnet assembly;
a plurality of packing rings sandwiched between the retainer rings in sealing relation with the valve stem and bonnet assembly, said packing rings being squeezed against the stem and bonnet assembly when said other retainer ring is urged toward said one retainer ring; and
a rigid chamfer ring positioned against each beveled edge of each retainer ring between the retainer ring and the adjacent packing ring, each chamfer ring having a cam surface thereon engaged by the corresponding beveled edge in camming fashion to force the chamfer rings against the valve stem and bonnet assembly in response to movement of said other retainer ring toward said one retainer ring, whereby said chamfer rings impede extrusion of said packing rings between the valve stem and chamfer rings and between the bonnet assembly and chamfer rings.

14. A gate valve as set forth in claim 13, including spring means for urging said other retainer ring outwardly to effect squeezing of said packing rings against the valve stem and bonnet assembly at low fluid pressures in the valve, said other retainer ring being movable away from said one retainer ring against the force of said spring means to accommodate thermal expansion of said packing rings.

15. A gate valve as set forth in claim 13, including a plurality of aligned openings in said retainer rings and packing rings and a plurality of pins in the respective openings.

16. A gate valve as set forth in claim 15, wherein at least one of said pins has a threaded connection with said other retainer ring.

17. A gate valve as set forth in claim 15, including:
a beveled edge around each opening of each retainer ring confronting the adjacent packing ring; and
an annular metal gasket positioned against each beveled edge of each retainer ring between the retainer ring and the adjacent packing ring, each gasket having a chamfer which is engaged by the corresponding beveled edge in camming fashion to urge the gaskets against the pins upon movement of said other retainer ring toward said one retainer ring, whereby extrusion of said packing rings between said pins and gaskets is impeded.

18. A gate valve as set forth in claim 13, including:
a second shoulder defined by said bonnet assembly at an inner end of said annular space, said second shoulder facing generally outwardly away from the flow passage and being spaced inwardly of said other retainer ring to present a spring chamber therebetween; and
a spring in said spring chamber acting to urge the other retainer ring outwardly for squeezing of the packing rings at low fluid pressures in the flow passage, said spring yielding to permit inward movement of said other retainer ring upon thermal expansion of said packing rings.

19. A gate valve as set forth in claim 18, including a sealant passage in the bonnet assembly communicating with said spring chamber for injecting sealant under pressure into said spring chamber.

20. A gate valve as set forth in claim 19, including a metal ring element engaging the valve stem in sealing relation thereto at a location inwardly of said spring chamber, said ring element having adjacent free ends meeting to form a joint which prevents leakage of sealant therethrough while permitting variation of the circumference of the ring element, said ring element having an outside surface of greater area than an inside surface thereof to contract the ring element against the valve stem under the influence of sealant pressure applied through said sealant passage.

21. A gate valve as set forth in claim 19, including:
a pair of spaced apart seal rings engaging the valve stem in sealing relation at a location inwardly of said spring chamber; and
a second sealant passage in the bonnet assembly communicating with the valve stem at a location between said seal rings for injection of sealant against the stem.

22. A gate valve as set forth in claim 21, including a fluid sealant passage in the bonnet assembly located inwardly towards said valve chamber of said second passage for injecting sealant against the valve stem.

23. A gate valve as set forth in claim 13, including at least one metal ring mounted in the bonnet assembly in sealing contact with the valve stem at a location inwardly of said other retainer ring, said metal ring scraping foreign material from the valve stem upon axial reciprocation of the stem.

24. A gate valve as set forth in claim 23, including:
a sealant passage in the bonnet assembly located outwardly of said metal ring for injecting sealant against the valve stem; and
a groove in the valve stem extending past said metal ring to provide communication between said sealant passage and valve chamber when said gate is in the closed position, thereby permitting application of sealant through said passage to the valve chamber in the closed position of the gate.

25. A gate valve as set forth in claim 13, wherein at least one of said packing rings is formed of a fusible metal which melts at a predetermined high temperature to provide a seal with the valve stem in the event of a fire.

26. A gate valve as set forth in claim 13, wherein said other retainer ring has a larger surface area facing toward the valve chamber than the surface of said packing rings facing toward the valve chamber, thereby amplifying the compressive force applied to said packing rings by said other retainer ring.

27. A gate valve comprising:
a valve body having a valve chamber and a fluid flow passage;
a gate mounted in the valve chamber for movement between an open position and a closed position relative to the flow passage;
a valve stem carrying the gate between the open and closed positions in response to axial reciprocation of the stem;
a bonnet assembly mounted to the valve body and having a bore in which said valve stem is received for axial reciprocation, said bonnet assembly defining an annular space in said bore around the valve stem and a shoulder facing generally toward the valve chamber at an outer end of said annular space;
a pair of packing retainer rings positioned in said annular space with one retainer ring disposed against said shoulder and the fluid pressure in said valve chamber acting to urge the other retainer ring toward said one retainer ring, each retainer ring having a beveled inside edge adjacent the valve stem and a beveled outside edge adjacent the bonnet assembly;
a plurality of packing rings sandwiched between the retainer rings in sealing relation with the valve stem and bonnet assembly, said packing rings being squeezed against the stem and bonnet assembly when said other retainer ring is urged toward said one retainer ring;
a rigid chamfer ring positioned against each beveled edge of each retainer ring between the retainer ring and the adjacent packing ring, each chamfer ring having a cam surface thereon engaged by the corresponding beveled edge in camming fashion to force the chamfer rings against the valve stem and bonnet assembly in response to movement of said other retainer ring toward said one retainer ring, whereby said chamfer rings impede extrusion of said packing rings between the valve stem and chamfer rings and between the bonnet assembly and chamfer rings;
a plurality of aligned openings in said retainer rings and packing rings, and a plurality of pins in the respective openings, at least one of said pins has a threaded connection with said other retainer ring, a beveled edge around each opening of each retainer ring confronting the adjacent packing ring;

an annular metal gasket positioned against each beveled edge of each retainer ring between the retainer ring and the adjacent packing ring, each gasket having a chamfer which is engaged by the corresponding beveled edge in camming fashion to urge the gaskets against the pins upon movement of said other retainer ring toward said one retainer ring, whereby extrusion of said packing rings between said pins and gaskets is impeded;

at least one metal ring mounted in the bonnet assembly in sealing contact with the valve stem at a location inwardly of said other retainer ring, said metal ring scraping foreign material from the valve stem upon axial reciprocation of the stem;

a sealant passage in the bonnet assembly located outwardly of said metal ring for injecting sealant against the valve stem; and a groove in the valve stem extending past said metal ring to provide communication between the sealant passage and valve chamber when said gate is in the closed position, thereby permitting application of sealant through said passage to the valve chamber in the closed position of the gate.

* * * * *